United States Patent
Noble

(10) Patent No.: US 12,502,736 B2
(45) Date of Patent: Dec. 23, 2025

(54) MANUAL TUBE WELDING DEVICE

(71) Applicant: Caterpillar Inc., Peoria, IL (US)

(72) Inventor: Matthew Meredith Noble, Gainesville, TX (US)

(73) Assignee: Caterpillar Inc., Peoria, IL (US)

( * ) Notice: Subject to any disclaimer, the term of this patent is extended or adjusted under 35 U.S.C. 154(b) by 897 days.

(21) Appl. No.: 17/742,029

(22) Filed: May 11, 2022

(65) Prior Publication Data

US 2023/0364722 A1 Nov. 16, 2023

(51) Int. Cl.
*B23K 37/02* (2006.01)

(52) U.S. Cl.
CPC ...... *B23K 37/0211* (2013.01); *B23K 37/0241* (2013.01)

(58) Field of Classification Search
CPC .......................... B23K 9/0286; B23K 9/0216; B23K 37/0211; B23K 37/0241; B23K 37/0217; B23K 37/0223; B23K 37/0229; B41J 3/4073
See application file for complete search history.

(56) References Cited

U.S. PATENT DOCUMENTS

| | | | | |
|---|---|---|---|---|
| 3,737,614 A | * | 6/1973 | Paulange | G05B 19/063 219/60 A |
| 3,806,694 A | * | 4/1974 | Nelson | F16D 63/00 219/60 R |
| 4,250,813 A | * | 2/1981 | Slavens | B23K 37/00 74/52 |
| 4,810,848 A | * | 3/1989 | Kazlauskas | B23K 9/0286 219/60 A |
| 5,147,997 A | * | 9/1992 | Haberman | B23K 9/013 219/121.48 |
| 5,227,601 A | * | 7/1993 | Black | B23K 9/12 219/60 R |
| 5,676,857 A | * | 10/1997 | Parker | B23K 9/0286 219/125.11 |
| 5,837,966 A | * | 11/1998 | Timmons, Jr. | B23K 9/1274 219/60 A |
| 5,981,906 A | * | 11/1999 | Parker | B23K 9/0286 219/60 R |

(Continued)

FOREIGN PATENT DOCUMENTS

| | | |
|---|---|---|
| CN | 101347884 | 10/2011 |
| CN | 108637431 | 5/2020 |

(Continued)

OTHER PUBLICATIONS

Machine Translation of Alguen (DE 102009058051) performed on May 8, 2025 (Year: 2009).*

(Continued)

*Primary Examiner* — Brian W Jennison

(57) ABSTRACT

A device for welding may include a track configured to surround a workpiece. The device for welding may also include a cart configured to contact the track such that the track guides the cart around the workpiece. The cart may include a frame and a welding torch receptacle. The welding torch receptacle can be attached to the frame. The welding torch receptacle may be configured to maintain a tip of the welding torch at a set distance away from the workpiece while the cart moves around the workpiece.

16 Claims, 7 Drawing Sheets

(56) References Cited

U.S. PATENT DOCUMENTS

| | | | | |
|---|---|---|---|---|
| 6,696,012 | B1* | 2/2004 | Theriot | B23K 37/0288 266/76 |
| 7,661,574 | B1* | 2/2010 | McGushion | B23K 37/0533 228/44.5 |
| 8,408,529 | B2* | 4/2013 | Falk | B25B 5/147 219/161 |
| 8,481,882 | B2* | 7/2013 | Kastelein | B23K 5/24 219/60 R |
| 8,573,470 | B2* | 11/2013 | Bonelli | B23K 9/0286 219/125.11 |
| 8,973,244 | B2* | 3/2015 | LaValley | B23K 37/0282 29/445 |
| 9,776,272 | B2* | 10/2017 | Einav | B23K 37/0282 |
| 10,421,104 | B1* | 9/2019 | Newmeister | B08B 1/12 |
| 10,730,140 | B2* | 8/2020 | Hsu | B23K 9/09 |
| 11,458,571 | B2* | 10/2022 | Rajagopalan | B23K 9/23 |
| 11,471,969 | B2* | 10/2022 | Tamm | B23K 9/0286 |
| 11,583,950 | B2* | 2/2023 | Ralls | B23K 20/106 |
| 11,926,003 | B2* | 3/2024 | Cook | B23K 37/0533 |
| 2006/0163317 | A1* | 7/2006 | Wirth | B23Q 1/527 228/32 |
| 2007/0023479 | A1* | 2/2007 | Koppert | B23K 9/0286 228/101 |
| 2007/0119829 | A1* | 5/2007 | Vietz | B23K 26/044 219/121.84 |
| 2010/0096793 | A1* | 4/2010 | Falk | F16L 3/1075 269/287 |
| 2013/0008881 | A1* | 1/2013 | Berbakov | B23K 9/0216 219/136 |
| 2013/0146566 | A1* | 6/2013 | Peters | B23K 9/1093 219/60 R |
| 2014/0197149 | A1* | 7/2014 | Ohta | B23K 7/00 219/138 |
| 2015/0298238 | A1* | 10/2015 | Van Rensburg | B23K 9/0286 219/137.31 |

FOREIGN PATENT DOCUMENTS

| | | |
|---|---|---|
| DE | 102009058051 | 11/2011 |
| DE | 102010028593 | 11/2011 |
| JP | H06155027 A | 6/1994 |
| KR | 20100008312 | 8/2010 |

OTHER PUBLICATIONS

Written Opinion and International Search Report for Int'l. Patent Appln. No. PCT/US2023/019175, mailed Aug. 7, 2023 (23 pgs).

* cited by examiner

MANUAL TUBE WELDING DEVICE

TECHNICAL FIELD

This disclosure relates to a device, and more particularly, to a device for manual welding. More particularly, this disclosure relates to a device for manual welding, or a fixture with a base, a rail extending from the base, and a cart that tides along the rail, the cart can hold and support a welding lead or a welding wand for manual welding.

BACKGROUND

There are many techniques for combining two objects. For example, welding can be used to combine a first metallic workpiece and a second metallic workpiece. One type of welding, metal inert gas or MIG welding can be used to combine two workpieces. MIG welding uses an electrical current through a feed wire to generate an arc and heat up both the first and second workpieces. As the arc heats up the first and second workpiece, the welding wire may also melt such that the welded joint can be a combination of a material of the first workpiece, a material of the second workpieces, and the material of the welding wire.

The inert gas can be introduced to the welding joint through a welding wand. For example, the welding wand can include a nozzle that directs a flow of inert gas toward the arc point created by the welding wire in contact with one or more of the first and second workpieces. The inert gas can help, shield the weld from reactive gases in atmosphere, ionize to help create a stable arc, improve energy transfer across the arc, and reduce the oxidation of the weld joint to help maintain the strength of the weld after the first and second workpieces have been combined.

Welding can be difficult, and welding in many directions (e.g., in the 4G, 5G, and 6G orientation) can be very difficult and can require a very skilled artisan. Moreover, welding workpieces of certain shapes (e.g., round, triangular, or square) can be more difficult.

German Patent Number DE 102,009,058,051 to Patentinhaber Gleich discloses a manually driven welding device with a guide rail and a guide carriage. The guide carriage can be guided on the guide rail and driven to produce a feed. The movement of a holder, welding torch, and a transmission device can advance the guide carriage.

SUMMARY OF THE INVENTION

In one example, a device for welding may include a track configured to surround a workpiece. The device for welding may also include a cart configured to contact the track such that the track guides the cart around the workpiece. The cart may include a frame and a welding torch receptacle. The welding torch receptacle can be attached to the frame. The welding torch receptacle may be configured to maintain a tip of the welding torch at a set distance away from the workpiece while the cart moves around the workpiece.

In another example, a system for welding a workpiece may include a welding torch configured to weld the workpiece. The welding torch may include a head and a tip. The system for welding a workpiece may also include a fixture for welding. The fixture for welding may include a track configured to surround the workpiece and a cart configured to contact the track such that the track guides the cart around the workpiece. The cart may include a frame and a welding torch receptacle. The welding torch receptacle may be configured to receive a head of a welding torch. The cart may be configured to maintain a tip of the welding torch at a set distance away from the workpiece while the cart moves around the workpiece.

In yet another example, a method of welding a first workpiece to a second workpiece using a fixture. The fixture may include a track that can be configured to surround the first workpiece and a cart that can be configured to contact the track such that the track guides the cart around the workpiece. The cart may include a frame and a welding torch receptacle. The welding torch receptacle may be attached to the frame and may be configured to receive a head of a welding torch. The method may include positioning the fixture around the first workpiece. The method may also include latching a latch that removably attaches a first piece and a second piece of the track to surround the first workpiece such that the one or more size adjusters contact the first workpiece. The method may also include welding the first workpiece to the second workpiece by moving the cart around the track while activating the welding torch.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
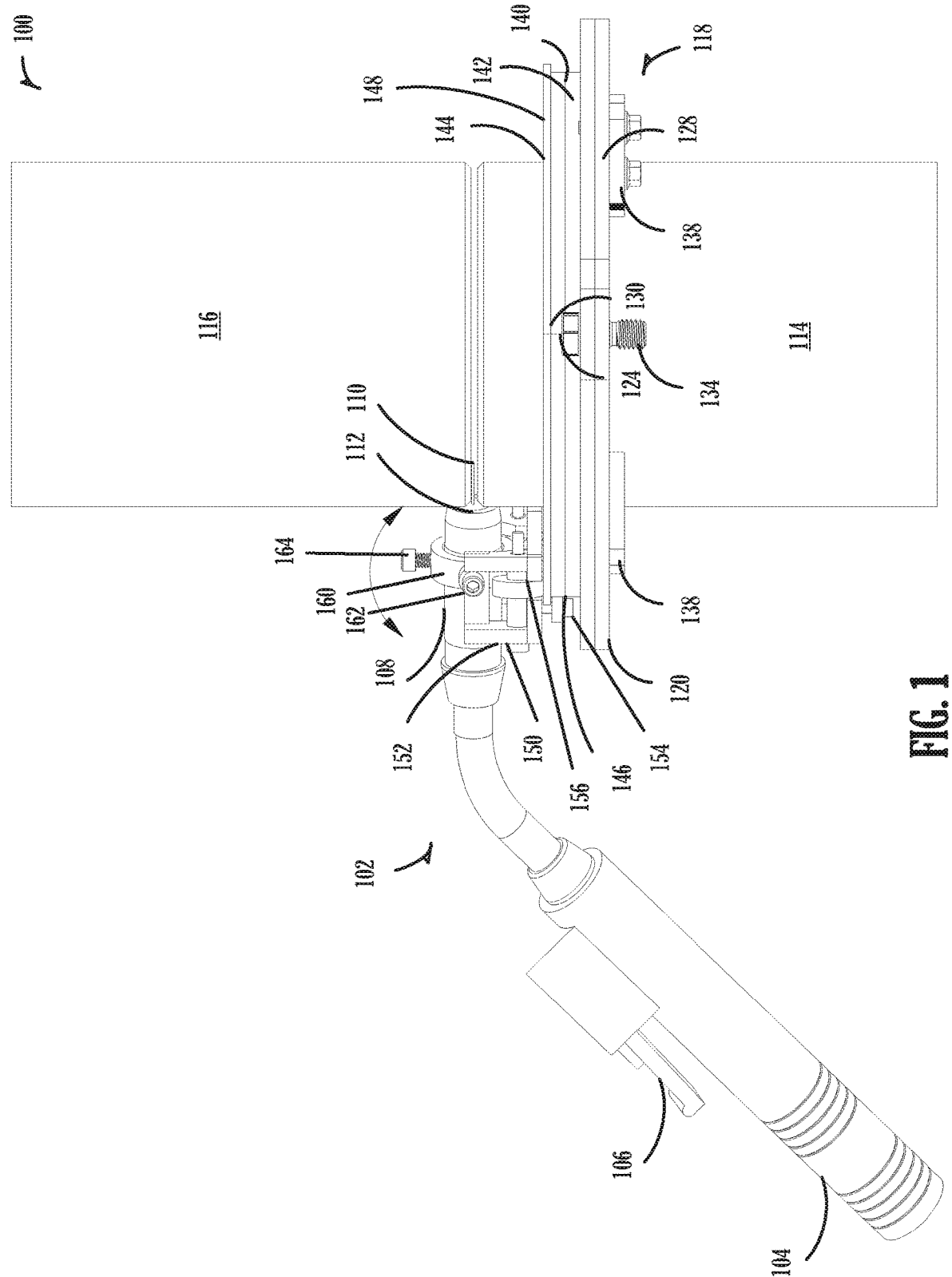
FIG. 1 is a perspective view of a welding device attached to a first workpiece to aid in the welding of the first workpiece and a second workpiece.
Figure 2:
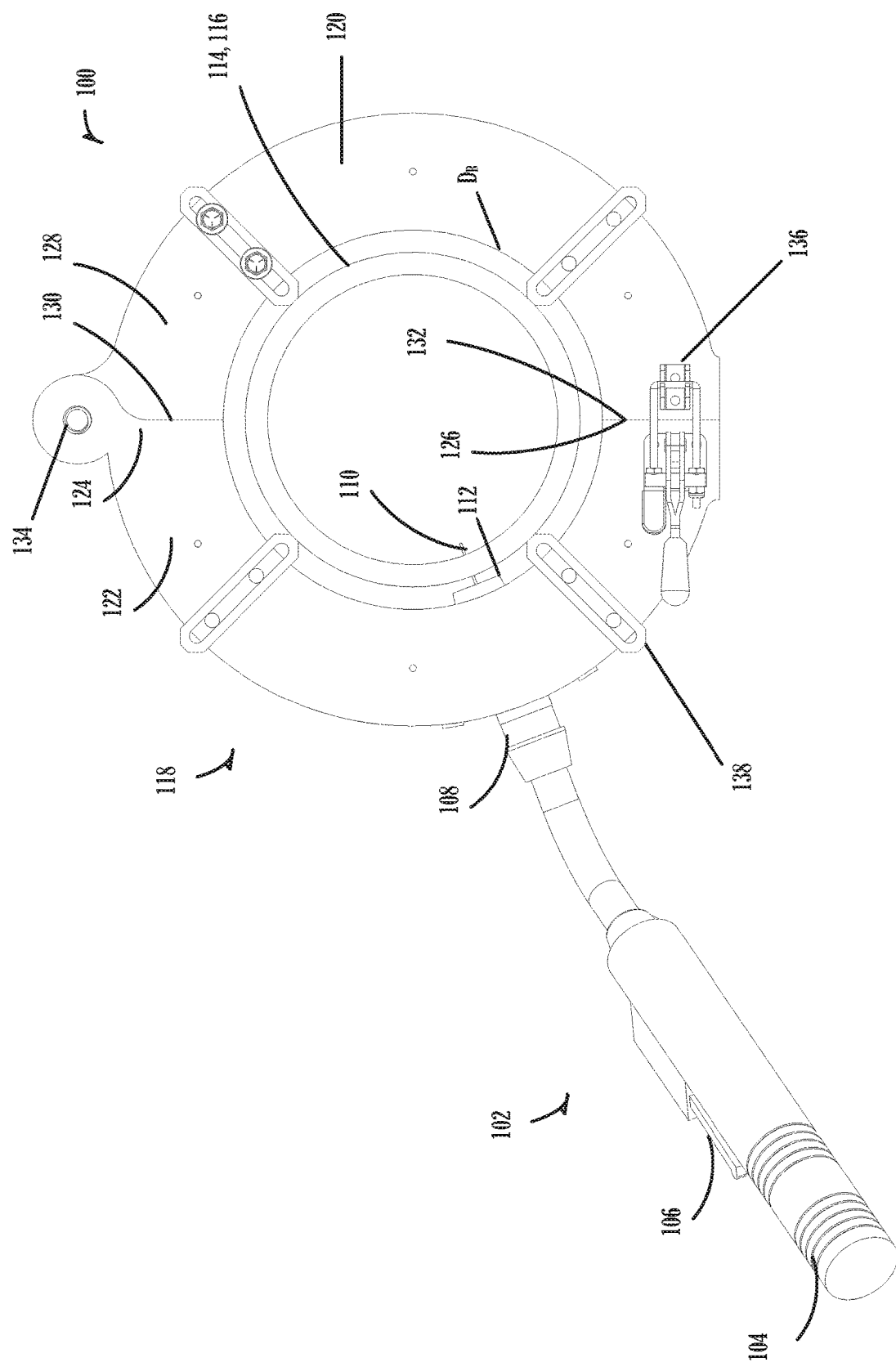
FIG. 2 is a bottom view of a welding device attached to a first workpiece to aid in the welding of the first workpiece and a second workpiece.
Figure 3:
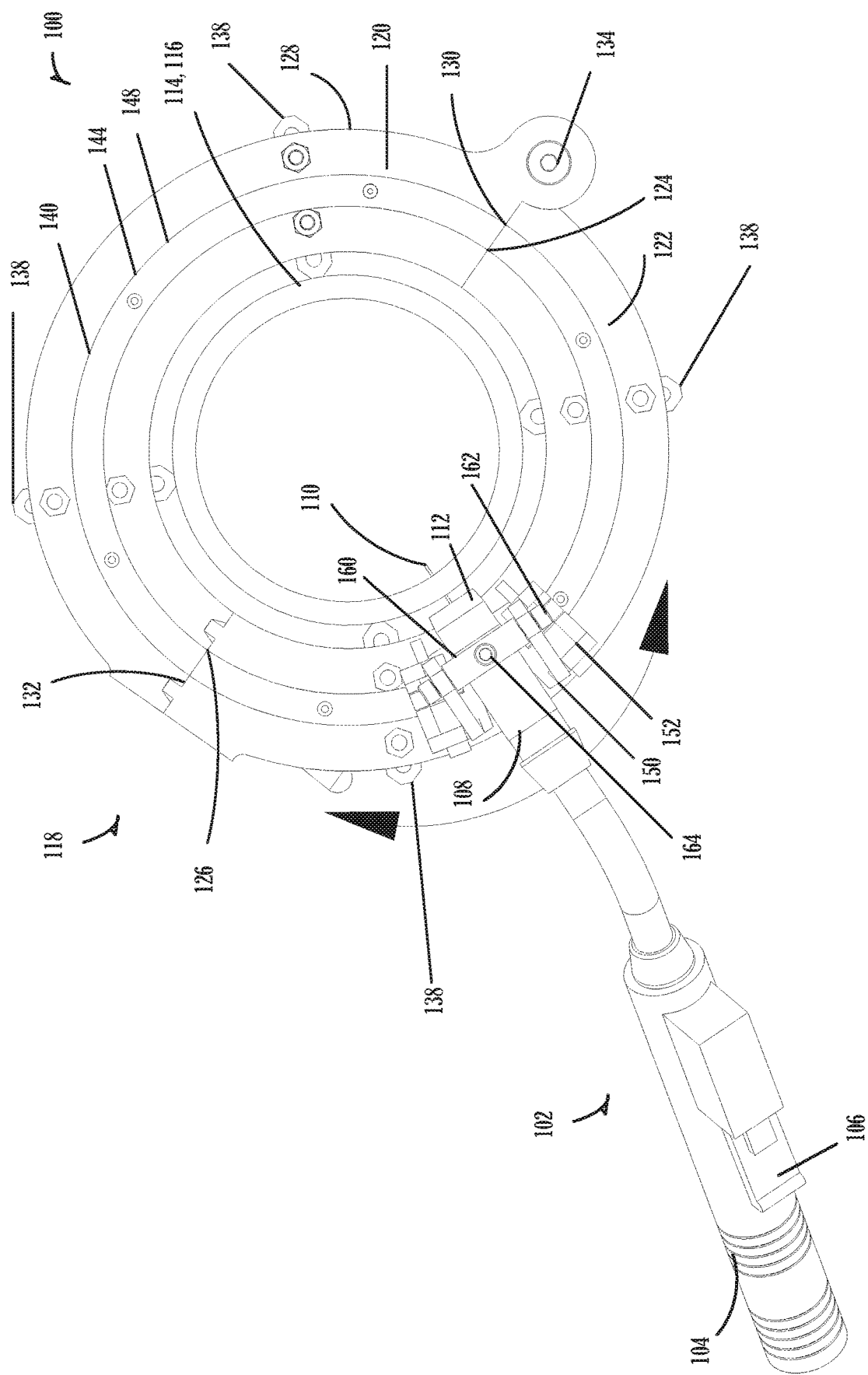
FIG. 3 is a top view of a welding device attached to a first workpiece to aid in the welding of the first workpiece and a second workpiece.

FIGS. 1-3 show three different views of a system 100 including a welding device or fixture (hereinafter "welding device 118") and a welding torch 102, FIG. 1 is a perspective view of a welding device 118 attached to a first workpiece 114 and/or a second workpiece 116 to aid in the welding of the first workpiece 114 and/or the second workpiece 116. FIG. 2 is a bottom view of the welding device 118 attached to the first workpiece 114 and/or the second workpiece 116 to aid in the welding of the first workpiece 114 and/or the second workpiece 116. FIG. 3 is a top view of the welding device 118 attached to the first workpiece 114 and/or the second workpiece 116 to aid in the welding of the first workpiece 114 and/or the second workpiece 116. FIGS. 1-3 will be discussed together below.

The welding torch 102 may be configured to weld the first workpiece 114 to the second workpiece 116. In examples, the welding torch 102 may be used to form a groove weld between the first workpiece 114 and the second workpiece 116. In other examples, the welding torch 102 may be used to form any other kind of weld between the first workpiece 114 and the second workpiece 116. The welding torch 102 may be a MIG, TIG, laser, or any other kind of welder that can be used to weld the first workpiece 114 to the second workpiece 116. As shown in FIGS. 1-3, the welding torch 102 may include a handle 104, a trigger 106, and a head 108.

The handle 104 may be configured to fit within the hand of a person such that the person can grasp the handle 104 to control the welding torch 102. The handle 104 can permit a welding wire 110 and a gas (not shown) to pass therethrough. In one or more examples, the handle 104 can be an elongated body.

The trigger 106 can be integral the handle 104, The trigger 106 may be configured to turn on and turn off the welding torch 102. For example, compressing the trigger 106 can turn on the welding torch 102 to weld one or more workpieces. In examples, releasing the trigger 106 can turn off the welding torch 102.

The head 108 can be configured to allow the welding wire 110 and the gas to pass therethrough. The head 108 can extend from the handle 104 toward a tip 112 of the welding torch 102, In one or more examples, the head 108 may be cylindrical. The head 108 may direct the gas from the handle 104 toward the tip 112 to help supply shielding gas to the welding pool and prevent oxidation of the weld.

The first workpiece 114 can be a tube, plate, bar, tab, or any other piece that needs to be joined to another piece. In examples, the first workpiece 114 can be metallic. In another example, the first workpiece 114 can be ceramic, plastic, or any other material that can be welded to another piece.

The second workpiece 116 can be a tube, plate, bar, tab, or any other piece that needs to be formed to another piece. In examples, the second workpiece 116 can be metallic. In another example, the second workpiece 116 can be ceramic, plastic, or any other material that can be welded to another piece.

In one example, the first workpiece 114 and the second workpiece 116 may be the same material. In another example, the first workpiece first workpiece 114 and the second workpiece 116 may be different materials. In one or more examples, the first workpiece 114 may be a tube (e.g., round, square, or triangular) and the second workpiece 116 may be a tube (e.g., round, square or triangular). In another example, the first workpiece 114 may be a tube and the second workpiece 116 may be a plate, bar, or tab. In yet another example, the first workpiece 114 can be a plate or an angled iron, and the second workpiece 116 can be a tube. In one or more examples, the first workpiece 114 and the second workpiece 116 can be any shape of workpieces that need to be welded or joined to another workpiece of the same or different shape.

In one or more examples, the welding device 118 may include a base 120, a track NO, or a cart 150. The welding device 118 can be configured to be attached to either the first workpiece 114 or the second workpiece 116. The welding device 118 may be configured to receive and guide a welding torch 102 around the first workpiece 114 and/or the second workpiece 116.

The base 120 may be configured to removably attach the welding device 118 to the first workpiece 114 and/or the second workpiece 116. In some examples, the base 120 may be circular and/or annular. The base 120 may have a first portion 122 and a second portion 128. The first portion 122 may extend from a first end 124 to a second end 126. The second portion 128 may extend from a first end 130 to a second end 132. In one or more examples, the first portion 122 and the second portion 128 may each form a portion of the circular or annular base 120. That is, in one or more examples, the first portion 122 and the second portion 128 may form half of the base 120 and may be half annular or crescent shapes, for example.

The base 120 may also include a pivot joint 134. The pivot joint 134 may be configured to pivotally attach the first end 124 of the first portion 122 to the first end 130 of the second portion 128. The pivot joint 134 may enable the welding device 118 to be installed and uninstalled from the first workpiece 114 and/or the second workpiece 116. For example, the first portion 122 and the second portion 128 can pivot about the pivot joint 134 such that the second end 126 of the first portion 122 and the second end 132 of the second portion 128 separate from each other. In the contrary, the first portion 122 and the second portion 128 can pivot about the pivot joint 134 such that the second end 126 of the first portion 122 and the second end 132 of the second portion 128 approach each other. In some examples, the pivot joint 134 may be a bolt and a nut. In another example, the pivot joint 134 may be a rivet, a pin, a shaft, or any other body that can enable the first portion 122 and the second portion 128 to pivot with relation to each other. In one or more examples, multiple pivot joints may be provided allowing the user to selectively release any pivot joint and pivot the portions about another pivot joint.

The base 120 may also include a latch 136, The latch 136 may be configured to removably attach the second end 126 of the first portion 122 to the second end 132 of the second portion 128. For example, the latch 136 can be engaged to removably attach the second end 126 of the first portion 122 and the second end 132 of the second portion 128 when the first portion 122 and the second portion 128 are rotated about the pivot joint 134 such that the second end 126 of the first portion 122 and the second end 132 of the second portion 128 approach each other. The latch 136 can hold the welding device 118 around the first workpiece 114 and/or the second workpiece 116 until the latch 136 is disengaged. Once the latch 136 is disengaged, the first portion 122 and the second portion 128 can pivot about the pivot joint 134 such that the second end 126 of the first portion 122 and the second end 132 of the second portion 128 separate from each other.

The base 120 may also include one or more size adjusters (hereinafter "size adjusters 138"). The size adjusters 138 may be configured to adjust the welding device 118 to fit the first workpiece 114 and/the second workpiece 116 within the welding device 118. Moreover, the size adjusters 138 can contact the first workpiece 114 and/or the second workpiece 116 to maintain a longitudinal position of the 118 on the first workpiece 114 and/or the second workpiece 116. The size adjusters 138 may be removably attached to the base opposite the track 140. As shown in the figures, the size adjusters 138 may include a slot and at least one bolt and nut, such that the size adjusters 138 can be adjusted to extend within an inner diameter $D_B$ (FIG. 2) of the base 120. In particular, the size adjusters 138 may be adjustable along substantially radially extending lines to collectively define diameters smaller than $D_B$. Thus, the size adjusters 138 may be adjusted to accommodate workpieces smaller than the inner diameter $D_B$ of the base 120. Moreover, the size adjusters 138 can be adjusted to make the welding device 118 concentric with the first workpiece 114 and the second workpiece 116. In one or more examples, the size adjusters 138 may include surface treatments on a surface that contacts the first workpiece 114 and/or the second workpiece 116. For example, the size adjusters 138 may include bumps or a coating to increase a surface friction between the size adjusters 138 and the first workpiece 114 and/or the second workpiece 116. The increased surface friction between the size adjusters 138 and the first workpiece 114 and/or the second workpiece 116 can help hold a longitudinal position of the welding device 118 on the first workpiece 114 and/or the second workpiece 116.

The track 140 may be configured to surround the first workpiece 114 and/or the second workpiece 116. In some examples, the track 140 may be circular. The track 140 may include a pad 142 and a flange 144. The pad 142 can extend from a side of the base 120 opposite from a side where the size adjusters 138 attach to the base 120. For example, the pad may extend from a top side of the base 120 while the size adjusters may be arranged on a bottom side of the base 120. The pad 142 may define a vertical surface 146. The flange 144 may extend perpendicular from the pad 142. The flange 144 may define a horizontal surface 148. In one or more examples, the flange 144 may have a diameter larger than the pad 142 and may form an overhanging lip extending around the periphery of the pad 142.

Figure 4:
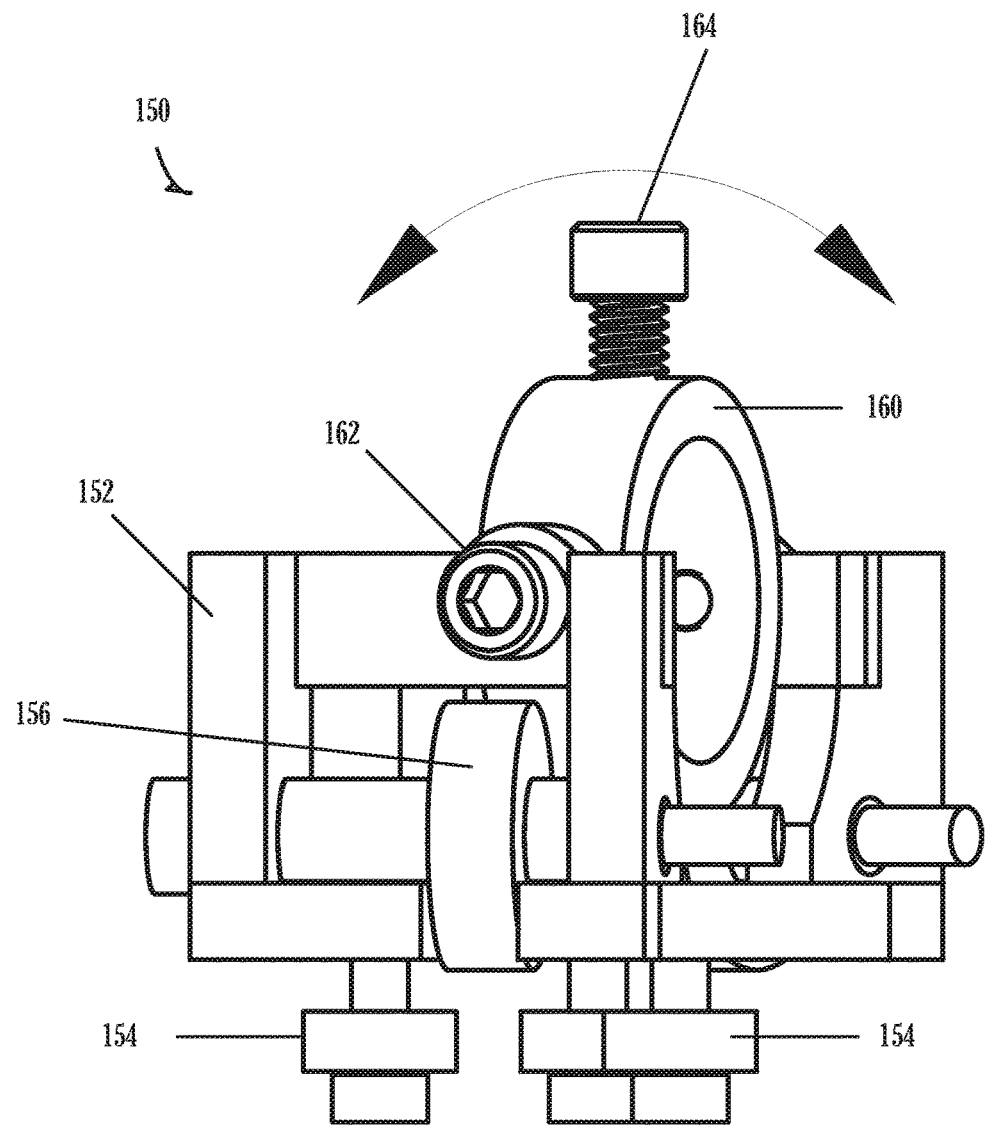
FIG. 4 is a perspective view of an example of a cart.
Figure 5:
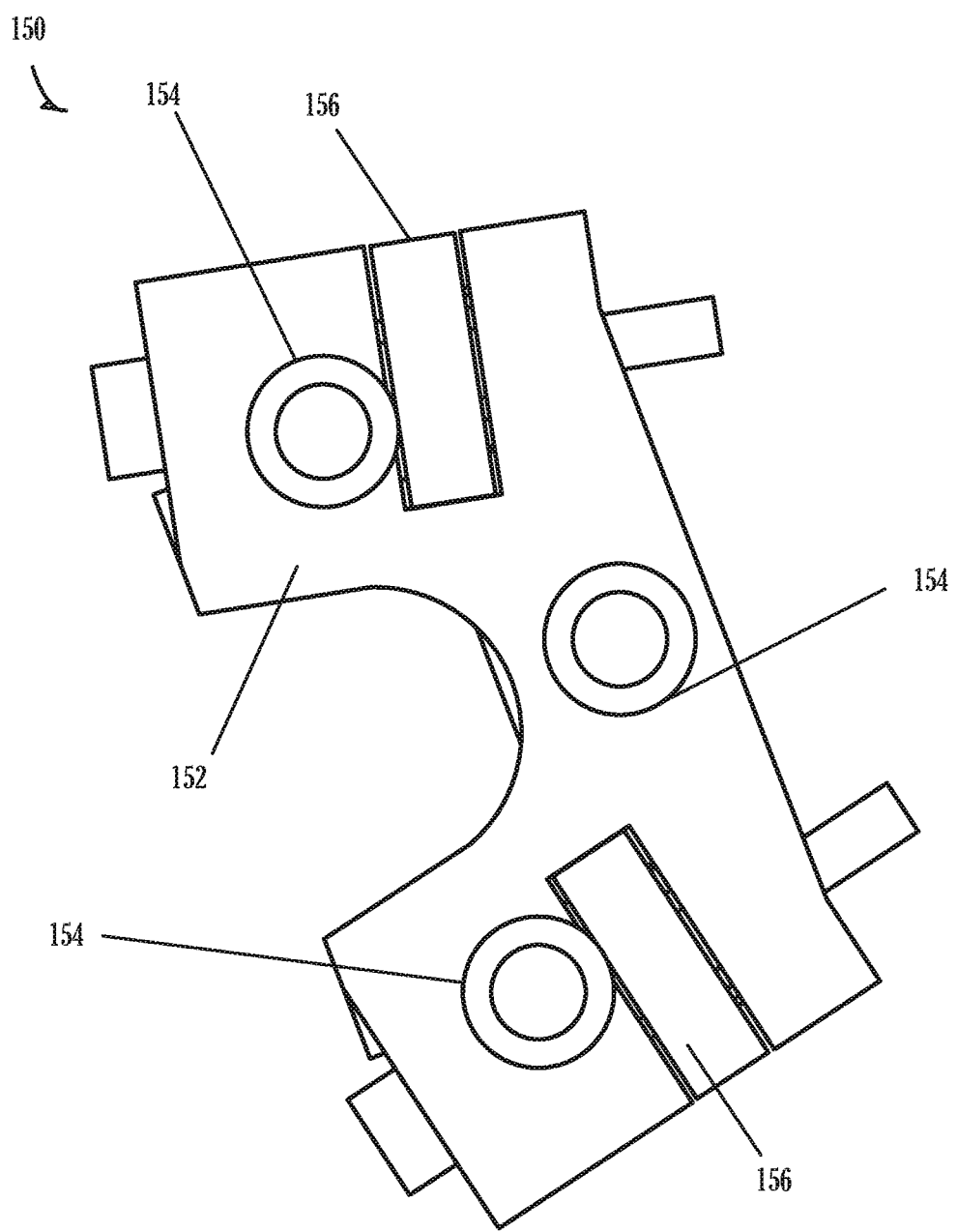
FIG. 5 is a bottom view of an example of a cart.

FIGS. 4 and 5 show more details of the cart 150 shown in FIGS. 1-3. Thus, the cart 150 will be described with reference to FIGS. 1-5 below. FIG. 4 is a perspective view of an example of the cart 150. FIG. 5 is a bottom view of an example of the cart 150. The cart 150 may be configured to contact the track 140 such that the track 140 guides the cart 150 around the first workpiece 114 and/or the second workpiece 116. The cart 150 may include a frame 152 and a welding torch receptacle 160.

The frame 152 may be configured to position, support, and direct the welding torch 102 as the cart 150 traverses around the first workpiece 114 and/or the second workpiece 116 by following the track 140. The frame 152 may include a series of plates or shapes arranged to support other aspects of the cart 150 and may be a weldment, a machined shape, or another type of frame may be provided. The frame 152 may include one or more bearing assemblies. For example, the frame may include a first bearing assembly 154 and a second bearing assembly 156.

In examples, the first bearing assembly 154 may be configured to contact the vertical surface 146 defined by the pad 142. The first bearing assembly 154 may be configured to provide lateral support and/or guidance to the cart 150 as the cart 150 travels along the track 140, In examples, the first bearing assembly 154 may include a spindle or an axle extending vertically downward and/or parallel to the vertical surface 146. The first bearing assembly 154 may also include a rotatable component arranged thereon for rollably engaging the vertical surface 146. In examples, the first bearing assembly 154 may have one or more bearings on a first side of the frame 152 and one or more bearings on a second side of the frame 152. Thus, the first bearing assembly 154 can be configured such that the cart 150 can be installed on the track 140 with the track 140, the pad 142, and at least a portion of the flange 144 between one or more bearings of the first bearing assembly 154.

In one or more examples, the rotatable component arranged on the spindle or axle may engage with the track 140 such that the cart 150 is on a top side of the track 140 and the rotatable components of the first bearing assembly 154 rollably contact the vertical surface 146 on a bottom side of the track 140 such that the flange 144 can extend between the rotatable component and the cart 150. Thus, the first bearing assembly 154 may prevent vertical removal of the cart 150 from the track 140.

In examples, the second bearing assembly 156 may be configured to contact the horizontal surface 148 defined by the flange 144. The second bearing assembly 156 may be configured to provide vertical support to the cart 150 as the cart 150 travels along the track 140. The second bearing assembly 156 may include one or more spindles or axles that extend substantially horizontally between one a first hole in the frame 152 and a second hole in the frame 152. The one or more spindles or axles may support a bearing, bushing, or a wheel such that the bearing, bushing, or wheel may contact the horizontal surface 148 of the flange 144. Therefore, the second bearing assembly 156 may apply a vertical force on the horizontal surface 148 to maintain a vertical position of the frame 152 and the first bearing assembly 154 of the cart 150 with relation to the track 140 as the cart 150 traverses the track 140.

Together the first bearing assembly 154 and the second bearing assembly 156 may provide lateral and vertical support such that the cart 150 can smoothly navigate around the track 140 without excess play. Reducing the play in the cart 150 navigating around the track 140 can help provide more consistent welds and improve the quality of a welding joint. As shown in 3, the first bearing assembly 154 and the second bearing assembly 156 may enable the cart 150 to move in either a clockwise or a counter-clockwise direction around the track 140. Moreover, the first bearing assembly 154 and the second bearing assembly 156 may secure the cart 150 on the track 140 such that the cart 150 does not fall off the track 140. Holding the cart 150 on the track 140 enables an operator to use the welding device 118 to weld in all orientations around the first workpiece 114 and/or the second workpiece 116. For example, the welding device 118 may be used to weld in 4G, 5G, and 6G orientations.

The welding torch receptacle 160 may be attached to the frame 152. The welding torch receptacle 160 may be configured to receive the head 108 of the welding torch 102. The welding torch receptacle 160 may connect the welding torch 102 to the cart 150 such that the welding torch 102 moves around the first workpiece 114 and/or the second workpiece 116 when the cart 150 moves along the track 140. The welding torch receptacle 160 may be circular and/or an annular body defining an insertion hole through which the welding torch 102 may be inserted and positioned. In examples, the welding torch receptacle 160 can be configured to attach the handle 104 or any other part of the welding torch 102 to hold the welding torch 102 at a distance from the first workpiece 114 and/or the second workpiece 116.

In examples, the welding torch receptacle 160 may include one or more pivot attachments (hereinafter "pivot attachment 162"). The pivot attachment 162 may be configured to allow the welding torch receptacle 160 to pivot about the pivot attachment 162. Thus, as indicated by the arrows in FIGS. 1 and 4, when the welding torch 102 is installed in the welding torch receptacle 160, the welding torch 102 can rotate about the pivot attachment 162 to move the tip 112 of the welding torch 102 between the first workpiece 114 and the second workpiece 116. Moving the tip 112 of the welding torch 102 between the first workpiece 114 and the second workpiece 116 while welding helps bridge the gap between the first workpiece 114 and the second workpiece 116. Moreover, the movement of the welding torch receptacle 160 about the pivot attachment 162 enables an operator to manipulate an arc, and/or a welding pool, while moving the welding torch 102 within the cart 150 around the first workpiece 114 and/or the second workpiece 116.

In examples, the pivot attachment 162 may define an axis of rotation of the welding torch receptacle 160. The pivot attachment 162 may define a horizontal axis of rotation. The horizontal axis of rotation enables an operator to weave the tip 112 of the welding torch 102 up and down between the first workpiece 114 and the second workpiece 116 while welding the first workpiece 114 and the second workpiece 116.

In one or more examples, the welding torch receptacle 160 may also include a set pin 164. The set pin 164 can be configured to hold the head 108 of the welding torch 102 within the welding torch receptacle 160 to maintain a distance between the tip 112 and the first workpiece 114 and/or the second workpiece 116. Thus, the welding torch receptacle 160 may include a threaded hole and the pin 164 may be threadably engaged in the threaded hole. Thus, rotation of the set pin 164 may cause the set pin 164 to impinge on the welding torch 102 to hold the welding torch 102 within the welding torch receptacle 160.

In one or more examples, the welding torch receptacle 160 may include more than one set pin 164. For example, the welding torch receptacle 160 may have two or three threaded holes, each of the threaded holes may engage a set pin 164 such that rotation of any of the set pin 164 may cause any one of the set pin 164 to impinge on the welding torch 102 to hold the welding torch 102 within the welding torch receptacle 160. The two or three set pin 164 in the welding torch receptacle 160 may allow an operator to further adjust the positioning of the welding torch 102 within the welding device 118, and more specifically within the welding torch receptacle 160.

In other examples, the welding torch receptacle 160 may include a ridge that interacts with a ridge on the head 108 of the welding torch 102 to set a distance that the head 108 goes within the welding torch receptacle 160. In yet another example, the welding torch receptacle 160 may include a mechanical or magnetic lock that holds the head 108 of the welding torch 102 within the welding torch receptacle 160.

Figure 6:
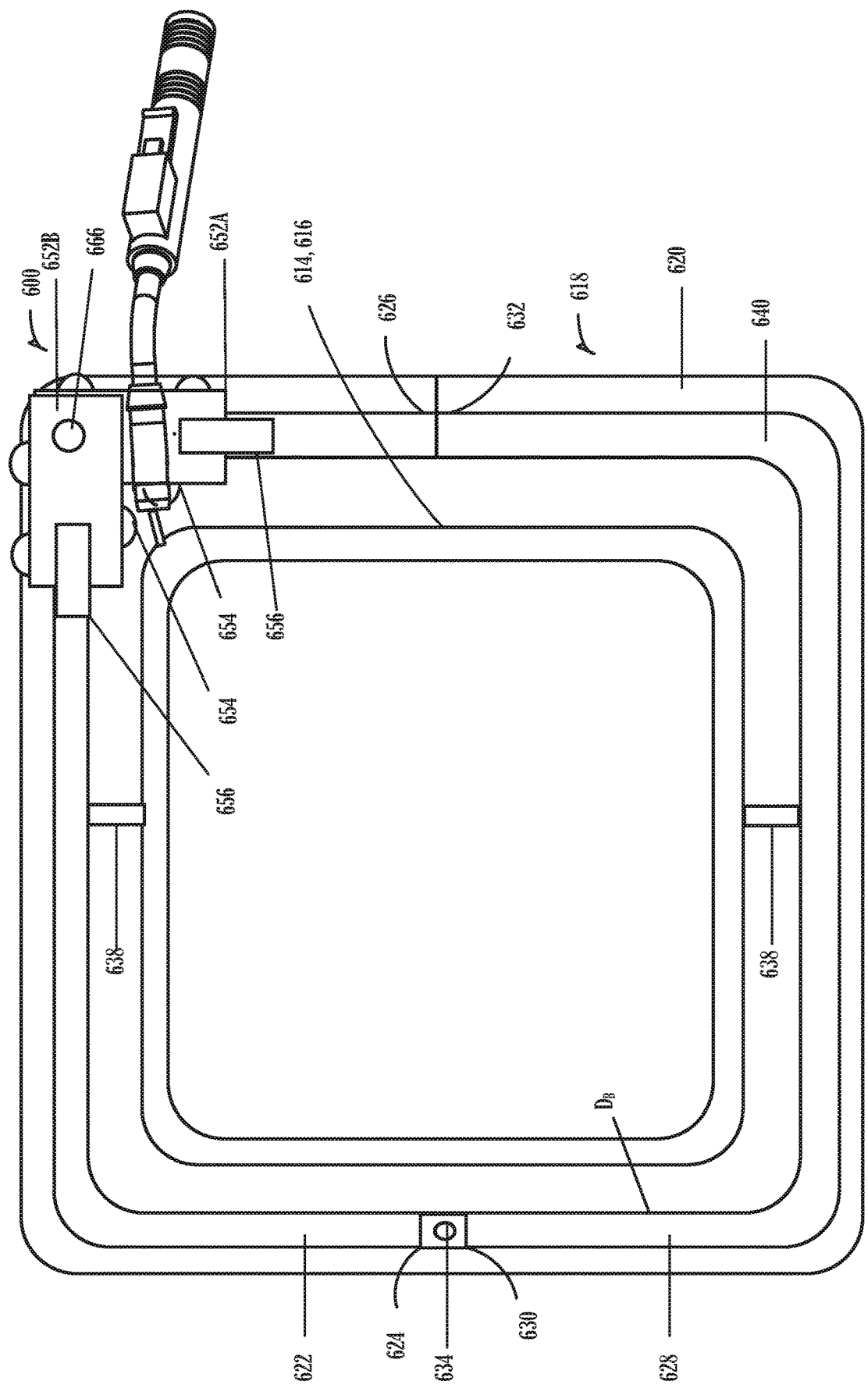
FIG. 6 is a schematic diagram of a welding device to aid in welding two square tubes.

FIG. 6 is a schematic diagram of a welding device 618 to aid in welding one or more square tubes. The system 600 may include a welding torch 602 and the welding device 618. The system 600 can be configured to connect to either a first workpiece 614 or a second workpiece 616 and weld the first workpiece 614 and the second workpiece 616.

As shown in FIG. 6, the first workpiece 614 and the second workpiece 616 can be a square tube. In another example, the first workpiece 614 may be a square tube and the second workpiece 616 may be a plate, or any other shape material that needs to be welded to the second workpiece 616. In yet another example, the second workpiece 616 may be a square tube and the first workpiece 614 may be a plate or any other shape material that needs to be welded to the first workpiece 614.

In one or more examples, the welding device 618 may include a base 620, a track 640, or a cart 650. The welding device 618 can be configured to be attached to either the first workpiece 614 or the second workpiece 616. The welding device 618 may be configured to receive and guide a welding torch 602 around the first workpiece 614 and/or the second workpiece 616.

The base 620 may be configured to removably attach the welding device 118 to the first workpiece 614 and/or the second workpiece 616. In the example shown in FIG. 6, the base 620 may be square. In another example, the base 620 may be triangular or any other shape to match the shape of the first workpiece 614 and/or the second workpiece 616. The base 620 may have a first portion 622 and a second portion 628. The first portion 622 may extend from a first end 624 to a second end 626. The second portion 628 may extend from a first end 630 to a second end 632. In one or more examples, the first portion 622 and the second portion 628 may each form a portion of the base 620. That is, in one or more examples, the first portion 622 and the second portion 628 may form half of the base 120 and may be half of a square or any other shape of the base 620 to match the first workpiece 614 and or the second workpiece 616.

The base 620 may also include a pivot joint 634. The pivot joint 634 may be configured to pivotally attach the first end 624 of the first portion 622 to the first end 630 of the second portion 628. The pivot joint 634 may enable the welding device 618 to be installed and uninstalled from the first workpiece 614 and/or the second workpiece 616. For example, the first portion 622 and the second portion 628 can pivot about the pivot joint 634 such that the second end 626 of the first portion 622 and the second end 632 of the second portion 628 separate from each other. In the contrary, the first portion 622 and the second portion 628 can pivot about the pivot joint 634 such that the second end 626 of the first portion 622 and the second end 632 of the second portion 628 approach each other. In some examples, the pivot joint 634 may be a bolt and a nut. In another example, the pivot joint 634 may be a rivet, a pin, a shaft, or any other body that can enable the first portion 622 and the second portion 628 to pivot with relation to each other. In one or more examples, the base 620 may include multiple pivot joint 634. Multiple pivot joint 634 may be provided allowing the user to selectively release any pivot joint 634 and pivot the portions about another pivot joint 634.

Similar to the base 120 shown in FIGS. 1-3, the base 620 may include a latch in the figures, for example, though not shown in FIG. 6, the base 620 may include the latch 136 to removably attach the base 620 to the first workpiece 614 or the second workpiece 616.

The base 620 may also include one or more size adjusters (hereinafter "size adjusters 638"). The size adjusters 638 may be configured to adjust the welding device 618 to fit the first workpiece 614 and/the second workpiece 616 within the welding device 618. Moreover, the size adjusters 638 can contact the first workpiece 614 and/or the second workpiece 616 to maintain a longitudinal position of the 618 on the first workpiece 614 and/or the second workpiece 616. The size adjusters 638 may be removably attached to the base opposite the track 640. As shown in the figures, the size adjusters 638 may include a slot and at least one bolt and nut, such that the size adjusters 638 can be adjusted to extend radially inward an inner dimension $D_B$ (FIG. 6) of the base 620. Thus, the size adjusters 638 may be adjusted to accommodate workpieces smaller than the inner dimension $D_B$ of the base 620. Moreover, the size adjusters 638 can be adjusted to make the welding device 618 concentric with the first workpiece 614 and the second workpiece 616.

In one or more examples, the size adjusters 638 may include surface treatments on a surface that contacts the first workpiece 614 and/or the second workpiece 616. For example, the size adjusters 638 may include bumps or a coating to increase a surface friction between the size adjusters 638 and the first workpiece 614 and/or the second workpiece 616. The increased surface friction between the size adjusters 638 and the first workpiece 614 and/or the second workpiece 616 can help hold a longitudinal position of the welding device 618 on the first workpiece 614 and/or the second workpiece 616.

The track 640 may be configured to surround the first workpiece 614 and/or the second workpiece 616. In some examples, the track 640 may be rectangular. In other examples, the track 640 may be triangular or any other shape to match the shape of the first workpiece 614, the second workpiece 616, and/or the welding device 618.

As shown in FIG. 6, the cart 650 may two frames, for example a frame 652A and a frame 652B, and a pivot member 666. The pivot member 666 may be configured to pivotally attach the frame 652A and the frame 652B. The pivot member 666 enables the frame 652A and the frame 652B to navigate around the track 640. Specifically, the pivot member 666 enable the cart 650 to navigate around corners in the track 640. In other examples, the cart 650, the frame 652A, the frame 652B, and the pivot member 666 can be adjusted to accommodate any shapes of the track 640. For example, the cart 650 may include a plurality of frames and a plurality of the pivot member 666 to hold multiple tools and or devices as the cart 650 navigates around the track 640.

Each of the frame 652A and frame 652B may be configured to position, support, and direct the welding torch 602 as the cart 650 traverses around the first workpiece 614 and/or the second workpiece 616. At least one of the frames 652A and 652B may include a welding torch receptacle to hold a head of a welding torch. For example, the welding torch receptacle 160 of FIGS. 1-5 could be installed on either of the frame 652A and the frame 652B to hold the welding torch 102 (FIGS. 1-5) or the welding torch 602.

Each of the frame 652A and the frame 652B may include a first bearing assembly 654 and a second bearing assembly 656. Together the first bearing assembly 654 and the second bearing assembly 656 may provide lateral and vertical support such that the cart 650 can smoothly navigate around the track 640 without excess play. Reducing the play in the cart 650 navigating around the track 640 can help provide more consistent welds and improve the quality of a welding joint. The first bearing assembly 654 and the second bearing assembly 656 may enable the cart 650 to move in either a clockwise or a counter-clockwise direction around the track 640.

Moreover, the first bearing assembly 654 and the second bearing assembly 656 may secure the cart 650 on the track 640 such that the cart 650 does not fall off the track 140. Holding the cart 650 on the track 640 enables an operator to use the welding device 618 to weld in all orientations around the first workpiece 614 and/or the second workpiece 616. For example, the welding device 618 may be used to weld in 4G, 5G, and 6G orientations. In another example, the welding device 618 may be used for fillet welds in 2F, 3F, 4F, 5F, and 6F orientations.

In another example, each of the frame 652A and the 652B may have an alternate engagement with the track 640. For example, the frame 652A and the frame 652B may have a slot (not shown) formed therein. The slot formed within the frame 652A and the frame 652B may be configured to fit around the track 640 such that the track 640 can guide the cart 650 around the first workpiece 614 and/or the second workpiece 616.

INDUSTRIAL APPLICABILITY

In at least one operable example, a method 700 may be used to weld a first workpiece and a second workpiece using one or more fixtures or welding devices. The one or more fixtures may include a track that is configured to surround the first workpiece and/or the second workpiece. The one or more fixtures may also include a cart configured to contact the tracks such that the track guides the cart around the first workpiece and/or the second workpiece. The cart may include a frame and a welding torch receptacle attached to the frame. The welding torch receptacle may be configured to receive the welding torch.

Figure 7:
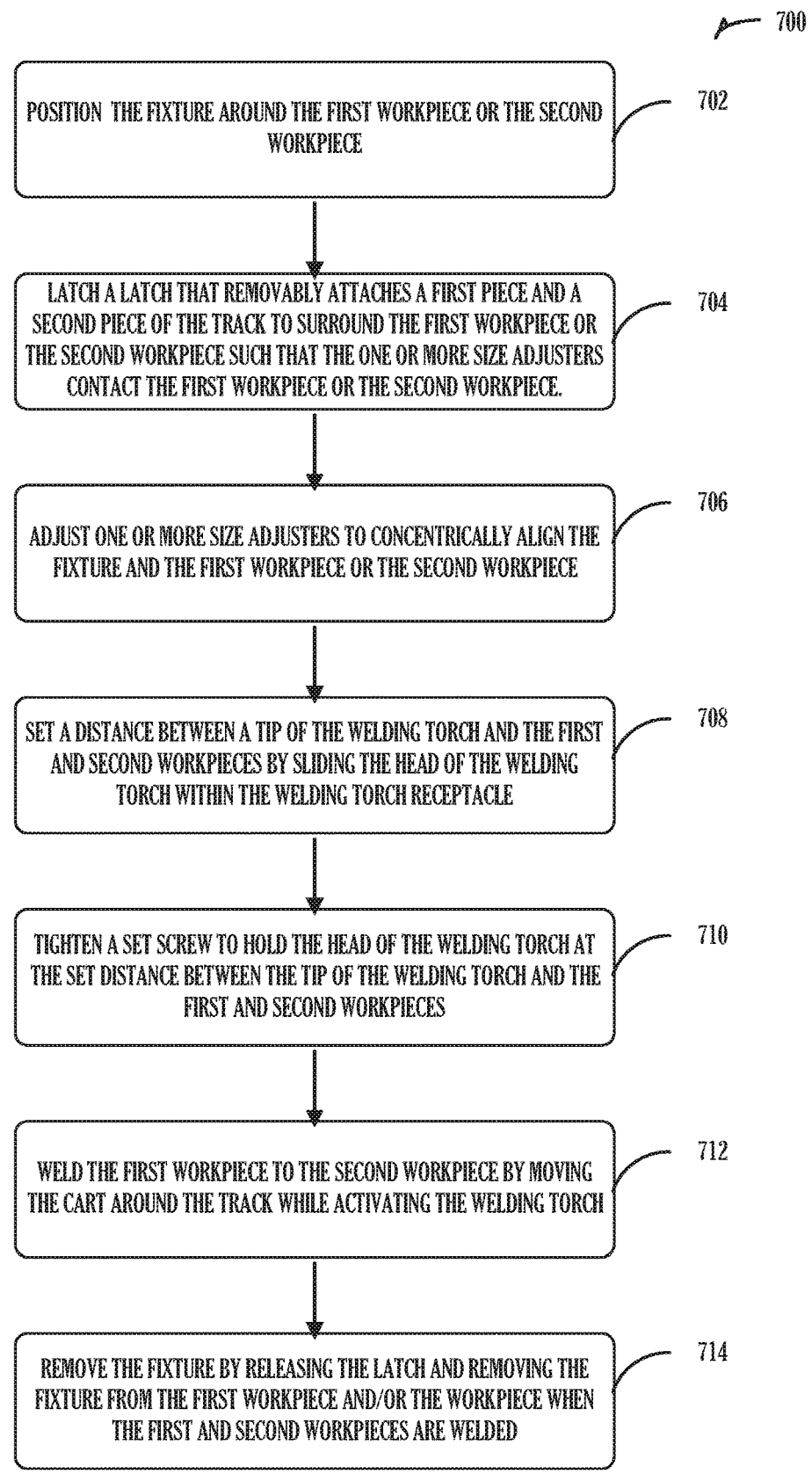
FIG. 7 is a flowchart of a method of using a device to aid in the welding of a first workpiece and a second workpiece.

FIG. 7 is a flowchart of the method 700 of using a device or fixture to aid in the welding of a first workpiece and a second workpiece.

At step 702 of the method 700, an operator may position the fixture around the first workpiece and/or the second workpiece. This may include pivotally opening the fixture to establish a gap between end portions of the fixture, moving the fixture into position around the workpiece, and pivotally closing the fixture. In other examples, the fixture may be slipped over an end of the workpiece.

At step 704 of the method 700, the operator may engage a latch that removably attaches a first piece and a second piece of the track to surround the first workpiece or the second workpiece such that the one or more size adjusters contact the first workpiece or the second workpiece. Engaging the latch may include actuating a lever to draw the end portions of the fixture together.

At step 706 of the method 700, the operator may adjust one or more size adjusters to concentrically align the fixture and the first workpiece or the second workpiece. For example, a bolt or nut that holds each of the one or more size adjusters may be loosened to slide the one or more size adjuster substantially radially inward until the one or more size adjuster contacts a workpiece. Then, the bolt or nut that holds each of the one or more size adjuster may be tightened to hold the one or more size adjusters in the set position. The set position can concentrically align the welding device and the first and/or second workpiece and can longitudinally align the one or more size adjuster on the first and/or second workpiece.

At step 708 of the method 700, the operator may set a distance between a tip of the welding torch and the first and second workpieces by sliding the head of the welding torch within the welding receptacle. For example, an operator can slide the head of the welding torch, or any other portion of the welding torch, within a hole defined by the annular welding torch receptacle.

At step 710 of the method 700, the operator may tighten a set screw to hold the head of the welding torch at the set distance between the tip of the welding torch and the first and second workpieces. Once the welding torch is positioned in the desired location (e.g., the desired distance away from the first and/or second workpiece) one or more set screws can be rotated such that the one or more set screws impinge the welding torch to hold the welding torch in the desired position.

At step 712 of the method 700, the operator may weld the first workpiece to the second workpiece by moving the cart around the track while activating the welding torch. In one or more examples, an operator may compress a trigger on the welding torch to begin welding the first workpiece and the second workpiece. While welding the first workpiece and the second workpiece the operator can guide the cart of the welding device around the first and second workpiece while rotating the tip of the welding torch up and down by rotating the welding receptacle around one or more pivot attachments between the welding receptacle and a frame of the welding device. The operator can continue to weld and move around the workpiece until the weld is completed.

At step 714 of the method 700, the operator may remove the fixture by releasing the latch and removing the fixture from the first workpiece and/or the second workpiece when the first and second workpieces are welded. For example, the operator may operate one or more levers to disengage the latch and separate a first portion and a second portion of the base from one another to open the welding device so it can be removed from the first and/or second workpiece.

The above-detailed description is intended to be illustrative, and not restrictive. The scope of the disclosure should, therefore, be determined with references to the appended claims, along with the full scope of equivalents to which such claims are entitled.

What is claimed is:

1. A device for welding comprising:
    a base configured to removably couple the device to a workpiece;
    a track configured to surround a workpiece, the track including:
        a pad extending from the base, the pad defining a first surface; and
        a flange extending perpendicular from the pad, the flange defining a second surface, the second surface perpendicular to the first surface; and
    a cart configured to contact the track such that the track guides the cart around the workpiece, the cart comprising:
        a frame;
        a first bearing system coupled to the frame and configured to contact the first surface;
        a second bearing system coupled to the frame and configured to contact the second surface; and
        a welding torch receptacle attached to the frame, the welding torch receptacle configured to receive a head of a welding torch;
    wherein the cart is configured to maintain a tip of the welding torch at a set distance from the workpiece and a longitudinal position thereon the workpiece while the cart moves around the workpiece.

2. The device of claim 1, wherein the base comprises:
    a first portion extending from a first end to a second end;
    a second portion extending from a first end to a second end;
    a pivot joint configured to pivotally attach the first end of the first portion to the first end of the second portion; and
    a latch configured to removably attach the second end of the first portion and the second end of the second portion.

3. The device of claim 1, wherein the welding torch receptacle comprises:
    a pivot attachment configured to pivotally attach the welding torch receptacle to the frame such that the tip of the welding torch can be moved with relation to the workpiece by rotating the welding torch receptacle about the pivot attachment.

4. The device of claim 3, wherein the welding torch receptacle further comprises a set pin configured to hold the head of the welding torch within the welding torch receptacle.

5. The device of claim 1, wherein the base further comprises:
    more than one size adjuster removably attached to the base opposite the pad, the more than one size adjuster configured to adjust the device to fit the workpiece within the device.

6. The device of claim 5, wherein:
    the workpiece is a round tube;
    the base and the track are circular such that the base and the track are concentric the round tube when the device is installed on the round tube;
    the base defines an inner diameter of the device, and
    the more than one size adjuster is configured to extend radially inward the inner diameter of the device.

7. The device of claim 5, wherein:
    the workpiece is a rectangular tube;
    the base and the track are rectangular such that the base and the track are concentric the rectangular tube when the device is installed on the rectangular tube;
    the base defines an inner perimeter of the device; and
    the more than one size adjuster is configured to extend radially inward the inner perimeter of the device.

8. The device of claim 7, wherein the cart comprises a second frame, the second frame is pivotally attached to the frame such that the cart can travel along the track when the track is rectangular.

9. A system for welding a workpiece, the system comprising:
    a welding torch configured to weld the workpiece, the welding torch comprising a head and a tip; and
    a fixture for welding, the fixture comprising:
        a base configured to removably couple the fixture to a workpiece;
        a track configured to surround the workpiece, the track including:
            a pad extending from the base, the pad defining a first surface; and
            a flange extending perpendicular from the pad, the flange defining a second surface, the second surface perpendicular to the first surface; and
        a cart configured to contact the track such that the track guides the cart around the workpiece, the cart comprising:
            a frame;
            a first bearing system coupled to the frame and configured to contact the first surface;
            a second bearing system coupled to the frame and configured to contact the second surface; and
            a welding torch receptacle attached to the frame, the welding torch receptacle configured to receive a head of a welding torch;
        wherein the cart is configured to maintain a tip of the welding torch at a set distance away from the workpiece while the cart moves around the workpiece.

10. The system of claim 9, wherein the welding torch is attached to a MIG welder.

11. The system of claim 9, wherein the base comprises:
    a first portion extending from a first end to a second end;
    a second portion extending from a first end to a second end;
    a pivot joint configured to pivotally attach the first end of the first portion to the first end of the second portion; and
    a latch configured to removably attach the second end of the first portion and the second end of the second portion.

12. The system of claim 9, wherein the welding torch receptacle comprises:
    a pivot attachment configured to pivotally attach the welding torch receptacle to the frame such that the tip of the welding torch can be moved with relation to the workpiece by rotating the welding torch receptacle about the pivot attachment.

13. A method of welding a first workpiece to a second workpiece using a fixture comprising a base configured to removably couple the fixture to a workpiece, a track configured to surround the first workpiece, the track including a pad extending from the base, the pad defining a first surface and a flange extending perpendicular form the pad, the flange defining a second surface, the second surface perpendicular to the first surface, and a cart configured to contact the track such that the track guides the cart around the workpiece, the cart comprising a frame, a first bearing system coupled to the frame and configured to contact the first surface, a second bearing system coupled to the frame and configured to contact the second surface, and a welding torch receptacle attached to the frame and configured to receive a head of a welding torch, the method comprising:

positioning the fixture around the first workpiece;

latching a latch that removably attaches a first piece and a second piece of the track to surround the first workpiece such that a one or more size adjusters contact the first workpiece, the first bearing system contacting the first surface and the second bearing system contacting the second surface; and welding the first workpiece to the second workpiece by moving the cart around the track while activating the welding torch.

14. The method of claim 13, further comprising:

adjusting the one or more size adjusters to concentrically align the fixture and the first workpiece;

setting a distance between a tip of the welding torch and the first and second workpieces by sliding the head of the welding torch within the welding torch receptacle; and tightening a set screw to hold the head of the welding torch at the set distance between the tip of the welding torch and the first and second workpieces.

15. The method of claim 14, further comprising:

filling a gap between the first and second workpieces by rotating the welding torch and the welding torch receptacle about at least one pivot attachment between the welding torch receptacle and the frame of the cart.

16. The method of claim 14, further comprising:

decoupling the latch to remove the fixture from the first workpiece when the first and second workpieces are welded.

* * * * *